United States Patent [19]
Knab et al.

[11] Patent Number: 5,777,446
[45] Date of Patent: Jul. 7, 1998

[54] METHOD OF POSITIONING A PART

[75] Inventors: Norbert Knab, Appenweier; Holger Pruessel, Buehlertal, both of Germany

[73] Assignee: Robert Bosch GmbH, Stuttgart, Germany

[21] Appl. No.: 679,272

[22] Filed: Jul. 12, 1996

[30] Foreign Application Priority Data

Jul. 27, 1995 [DE] Germany .......................... 195 27 456.3

[51] Int. Cl.$^6$ .................. B60J 1/12; G05B 9/02; E05F 15/16
[52] U.S. Cl. ...................... 318/265; 318/266; 318/286
[58] Field of Search ........................ 318/264, 265, 318/266, 267, 286, 466, 468

[56] References Cited

U.S. PATENT DOCUMENTS

| | | | |
|---|---|---|---|
| 4,514,670 | 4/1985 | Fassel et al. | 318/467 |
| 4,563,625 | 1/1986 | Kornbrekke et al. | |
| 4,730,152 | 3/1988 | Foust et al. | 318/603 |
| 4,999,551 | 3/1991 | Yoshida et al. | 318/286 |
| 5,038,087 | 8/1991 | Archer et al. | 318/469 |
| 5,198,974 | 3/1993 | Orsat | |
| 5,610,484 | 3/1997 | Georgin | 318/286 |

FOREIGN PATENT DOCUMENTS

| | | |
|---|---|---|
| 3235837A1 | 5/1983 | Germany . |
| 3729312A1 | 3/1989 | Germany . |
| 9114598.8 | 3/1992 | Germany . |
| 4219188A1 | 12/1993 | Germany . |

*Primary Examiner*—Bentsu Ro
*Attorney, Agent, or Firm*—Michael J. Striker

[57] ABSTRACT

A method of positioning a part includes the steps of reciprocatingly moving a part between two end positions by a drive, generating a control signal for the drive upon reaching the end positions, stopping the drive or changing a drive direction of the drive upon receipt of the control signal; detecting a position of the drive after a first reaching of at least one of the end positions by the part, storing the detected position of the drive, and during further approaches of the end positions by the part, stopping the drive or changing the drive direction before reaching the end positions. After a selectable number of approaches of the part to at least one of the end positions the drive is stopped only when the end position is reached and the position of the drive is detected and stored once again.

10 Claims, 1 Drawing Sheet

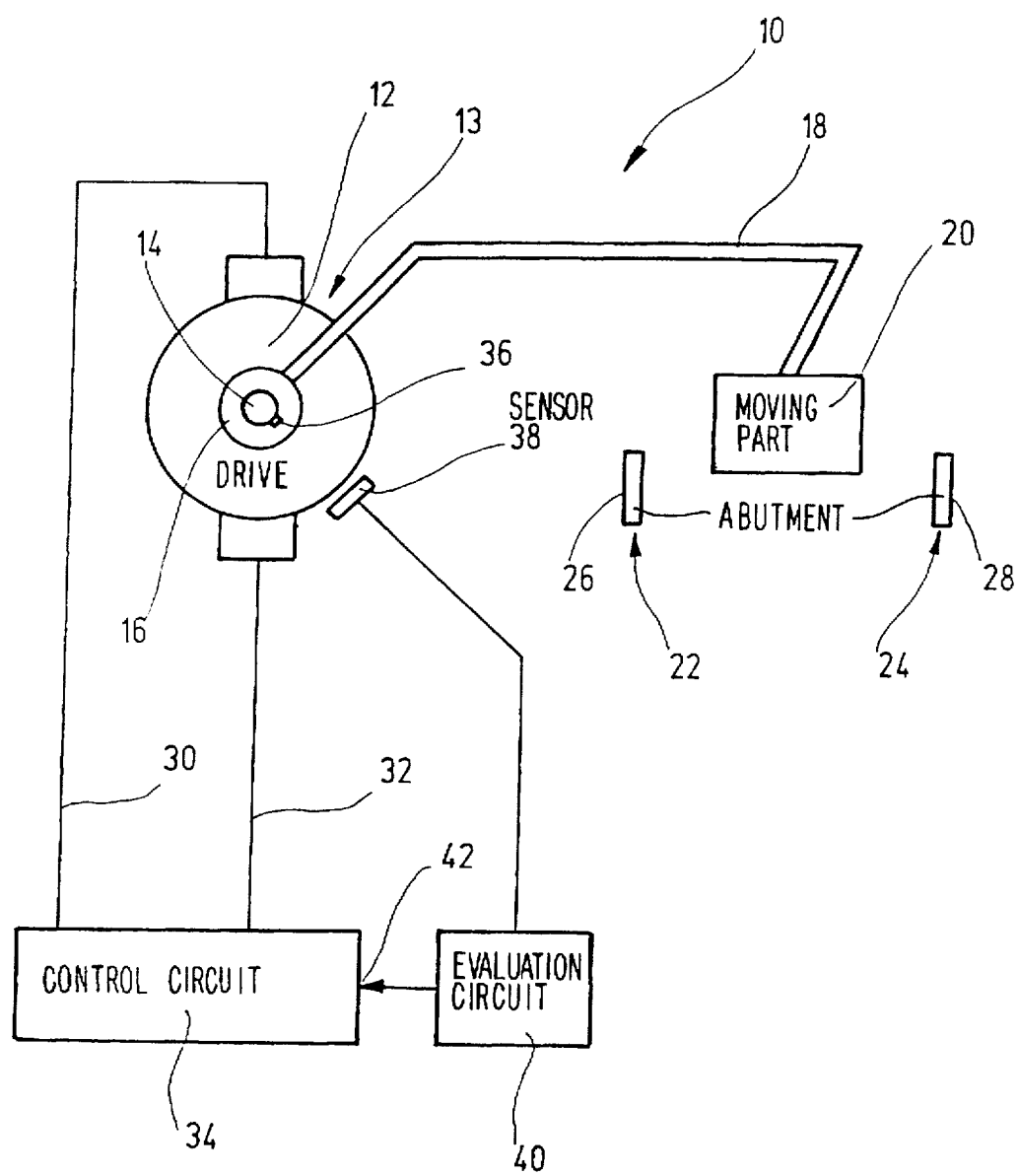

METHOD OF POSITIONING A PART

BACKGROUND OF THE INVENTION

The present invention relates generally to a method of positioning a part.

It is known to combine parts with a drive for reciprocating the parts between two end positions. In the end positions, conventionally abutments are provided against which the parts are moved by the drive. When the end position is reached, an end switch for example is actuated and turns off the drive. Furthermore, it is also known to allow the part to run against the end abutment by the drive so as to detect a change of the motor current and the motor speed in the case of an electric motor drive and to turn off the drive. All these arrangements have a disadvantage that with striking of the movable part against an end abutment, a mechanical loading of the drive, the movable part and the end abutment occurs. For example, electrically operated window openers are moved against a lower and an upper abutment in the motor vehicles. During movement against the lower abutment, a relatively hard striking takes place, which is increased to a higher power by the energy mass of the movable window opener. The window opener system is therefore subjected to a high mechanical loading which negatively affects its endurance strength and therefore its service life.

The German Document DE-OS 37 29 312 discloses a method of positioning a part, in accordance with which the end abutments defining the end positions are replaced by a position actual value transducer. It detects the position of a measuring member which moves synchronously with the movable part. The position of the measuring member is evaluated electronically and it controls the motor of the drive.

Furthermore, it is known to record the last end position at which a door of a sliding door system stops and to slow the door and stop if in a position before the end position the next time it approaches the end position.

SUMMARY OF THE INVENTION

Accordingly, it is an object of the present invention to provide a method of positioning a part, which avoids the disadvantages of the prior art.

In keeping with these objects and with others which will become apparent hereinafter, one feature of the present invention resides, briefly stated, in a method of positioning a part which is reciprocally movable by a drive between two end positions and upon reaching the end positions a control signal for the drive is generated to stop the drive or to change its drive direction, wherein in accordance with the present invention during the first reaching of at least one end position, the position of the drive is detected and stored, and during further approaching by the part of the end positions, before reaching the end positions the drive is stopped or its drive direction is changed.

When the method is performed in accordance with the present invention, the endurance strength of the part to be positioned and the system which includes the drive can be substantially improved. Since during first reaching of at least one end position, the position of the drive is detected and stored and during further reaching by the part of the end position the drive is stopped before reaching the end position or its drive direction is changed, it is possible in an advantageous manner to stop the part to be positioned at a right time to prevent a mechanical impact with one of the end abutments. Thereby the mechanical loading of the whole system is substantially reduced. Moreover, the loading of a drive motor of the drive is reduced, since it no longer must be brought to a stop during full running in a driving direction. In some cases it is desirable, with consideration of the position of the drive in an end position of the part to be moved, to reduce the drive energy slower so as to mildly brake the drive before reaching the end position. Thus, the method of the present invention provides for a very fine positioning of a part against two end positions.

In accordance with an advantageous embodiment of the present invention, after the position of the drive during reaching of at least one end position is determined and then the drive is stopped each time before reaching the end position, the part in selected approaching intervals is stopped at the end position not before reaching the end position, but it is moved to the end position. For this purpose advantageously a postadjustment of the total drive system can be performed so that changes of the position or of the total drive system during the predetermined use can be taken into consideration. Therefore, despite eventually occurring changes, the part can be stopped at a right time before reaching the end position in a reliable way.

Because of the inventive learning or post-learning of at least one end position for a part to be positioned, the number of cycles with which the part is movable against its end positions can be increased and therefore the total service life of the drive system is increased.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing an arrangement for performing a method of positioning a part in accordance with the present invention.

DESCRIPTION OF PREFERRED EMBODIMENTS

A drive system for positioning a part in accordance with a method in accordance with the present invention is shown schematically in the drawings and identified as a whole with reference numeral 10. The drive system 10 has a drive 13 which is formed as an electric motor 12. A drive shaft 14 of the electric motor 12 extends into a schematically shown transmission 16. The transmission 16 is connected through a transmitting device 18 with a part 20 to be positioned.

The part 20 is reciprocatingly movable by the drive 13 between a first end position 22 and a second end position 24 formed by two end abutments 26 and 28 respectively. The electric motor 12 is connected through connecting conductors 30 and 32 with a control circuit 34. The drive shaft 14 of the electric motor 12 carries a signal transducer 36 which produces signals detectable by a sensor 38. The sensor 38 is connected with an evaluating circuit 40. The evaluating circuit 40 is connected with an input 42 of the control circuit 34.

The drive system 10 shown in the drawing can be used for example for the displacement of electrical window opener in motor vehicles. This however only one of possible applications of the present invention. It is to be understood that it is also possible to use the drive system 10 for other applications, in which a part must be moved between two end positions. These applications are not limited only to the corresponding designs in motor vehicles.

The drive system 10 shown in the drawings performs the following functions in connection with its utilization for a drive system for the window opener in motor vehicles.

When the drive system 10 is assembled, the electric motor 12 is set in operation through the control circuit 34. The rotatable drive shaft 14 engages the transmission 16 so that, in a known manner, the transmitting device 18 and the part 20 are moved relative to one of the abutments 26 or 28. It is assumed that the end abutment 26 is a lower abutment of the window opener and the end abutment 28 is correspondingly an upper abutment of the window opener. With each revolution of the drive shaft 14, a signal of the signal transducer 36 is detected at the sensor 38. When the part 20 is moved relative to the end abutment 26 and reaches it, the sensor 38 recognizes that no more pulses of the signal transducer 36 are produced. The evaluating circuit 40 therefore provides a control signal for the control circuit 34 which turns off the electric motor 12. A not shown counter of the evaluating circuit 40 is simultaneously set to 0.

After this, the electric motor 12 is again set in operation through the control circuit 34 so that the part 20 now is moved relative to the end abutment 28. Therefore the sensor 38 receives a number of signals of the signal transducer 36 which corresponds to the number of revolutions of the drive shaft 14 and this is detected in the evaluating circuit 4. For this purpose a suitable counter is run up. After reaching the end abutment 28 the sensor 38 no longer receives signals of the signal transducer 36. Therefore a corresponding control signal is provided at the control circuit 34 and the electric motor 12 is stopped. After the setting of the drive system 10 in operation, the evaluating circuit 40 stores the information as to how many revolutions of the drive shaft 14 of the electric motor 12 must be performed so that the part 20 can move from its end abutment 26 to its end abutment 28. Therefore a definition of the end abutment 26 and 28 with respect to the number of the revolution of the electric motor 12 is performed, or in other words the end abutments 26 and 28 are learned. After the thusly performed adjustment of the drive system 10, during the subsequent predetermined utilization, the counter in the evaluating system 14 storing the number of the revolutions of the drive shaft 14 counts in correspondence of the movement direction of the part 20 with respect to its lower or upper stored value. Thereby with an evaluation of the counter condition, the approach of the part 20 to its end position 26 or 28 can be determined.

When the counter condition reaches a predetermined value which signals that the part 20 is located only a small number of revolutions of the drive shaft 14 before its end abutment 26 or 28, the evaluating circuit 40 produces a signal at the control circuit 34 which stops the electric motor 12. Thereby the part 20 is stopped before it strikes against the end abutment 26 or the end abutment 28. Therefore a mechanical loading of the total drive system by striking the part 20 against the end abutment 26 or the end abutment 28 is prevented. The number of revolutions of the electric motor 12 with which the part 20 must be stopped before the end abutment 26 or the end abutment 28 can be selected freely.

The evaluating circuit 40 can be provided with a further counter which determines the approach cycle of the part 20 to its end abutments 26 and 28. This counter is designed so that after a freely selectable number of approaches to one or both end abutments 26 and 28, a control signal at the control circuit 34 is formed so that the part 20 is not stopped before reaching the end abutment but instead when it is moved to this abutment. Simultaneously, the counter which detects the number of revolutions of the electric motor 12 is set to zero. Thereby a post-learning of the end abutments 26 and 28 is performed so that the fluctuations occurring during the operation of the drive system 10 can be compensated. During further movements with respect to the corresponding other end abutments 26 and 28, again the number of the revolutions of the electric motor 12 is detected by the sensor 38 and correspondingly stored in the evaluating circuit 40. It is thereby guaranteed that every time, or in other words also over a longer utilization time of the drive system 10 a definite holding of the part 20 before its end abutments 26 and 28 can be provided.

For a concrete application embodiment, the evaluating circuit 40 can be for example adjusted so that the part 20 is held before its end abutments 26 and/or 28 for example two revolutions of the electric motor 20 before the actual end abutment 26 and 28. The number of the approach cycles of the part 20 relative to the end abutments 26 or 28 after which a post-learning is performed can be for example 5.

Summarizing the above presented explanations, it can be said that a drive system 10 provides for a fine reciprocating movement of the part 10 between its end abutments. Thereby the wear of the drive system 10 is reduced and the total service life is increased. In particular, a higher cycle number of movement of the part 20 against its end abutments 26 and 28 can be achieved.

The embodiment described hereinabove is of course only exemplary. For example other suitable devices can be provided for detecting the number of the revolutions of the electric motor 20 and for performing a control of the control circuit 34 in accordance with a corresponding evaluation.

It will be understood that each of the elements described above, or two or more together, may also find a useful application in other types of methods and constructions differing from the types described above.

While the invention has been illustrated and described as embodied in method for positioning a part, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of positioning a part, comprising the steps of reciprocatingly moving a part between two end positions by a drive; generating a control signal for the drive upon reaching the end positions; stopping the drive or changing a drive direction of the drive upon receipt of the control signal; detecting a position of the drive after a first reaching of at least one of the end positions by the part; storing the detected position of the drive and, during further approaches of the end position by the part, stopping the drive or changing the drive directions before reaching the end positions unless a postadjustment is performed, said postadjustment being performed after a selected number of approaches of the part to at least one of the end positions, said postadjustment including stopping the part at reaching one of the end positions again detecting the position of the drive, storing said position detected again for use in place of said position previously stored.

2. A method as defined in claim 1, wherein said detecting includes determining a position of a drive shaft of the drive during first reaching of the end positions, and subsequently detecting a number of revolutions of the drive shaft between the end positions.

3. A method as defined in claim 1; and further comprising slowly reducing a rotary speed of a drive shaft of the drive before reaching a stopped position by the drive before the end positions.

4. A method as defined in claim 3, wherein said stopping before reaching the end position includes stopping a drive shaft of the drive after a selectable number of revolutions of the drive shaft before reaching the end positions.

5. A method as defined in claim 4, wherein said stopping includes stopping the drive after 1–5 revolutions of the drive shaft before reaching the end positions.

6. A method as defined in claim 5, wherein said stopping includes stopping the drive after 2 revolutions of the drive shaft before reaching the end positions.

7. A method as defined in claim 1, wherein the number of approaches of the part to at least one of the end positions is selected to be between 3 and 9.

8. A method as defined in claim 7, wherein the number of approaches of the part to one of the end positions is selected to be 5.

9. A method as defined in claim 1; and further comprising slowly reducing a rotary speed of a drive shaft of the drive before reaching the end positions by the drive.

10. A device for positioning a part, comprising a drive for reciprocating the part between two end positions; means for generating a control signal for said drive during reaching the end positions; means for stopping said drive or changing its drive direction in response to the control signal; means for detecting a position of said drive during a first approach of at least one of the end positions by the part; means for storing the detected position of the drive, said means for stopping said drive or changing its drive direction being formed so that during further approaches of the end position by the part, the drive is stopped or the drive direction is changed before reaching the end positions unless a post adjustment is performed after a selected number of approaches of the part to at least one of the positions, by stopping the part at reaching one of the end positions, again detecting the position of the drive, storing said position detected against for use in place of said position previously stored.

* * * * *